United States Patent
McDonough et al.

(10) Patent No.: US 6,933,949 B1
(45) Date of Patent: Aug. 23, 2005

(54) METHOD FOR INTERPOLATION OF TRISTIMULUS COLOR DATA

(75) Inventors: Timothy M. McDonough, Escondido, CA (US); Paul H. Dillinger, Escondido, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/806,355

(22) Filed: Feb. 26, 1997

(51) Int. Cl.[7] ............................................. G06T 11/40
(52) U.S. Cl. ....................................................... 345/591
(58) Field of Search ............................... 345/418, 581, 345/589–597, 600, 604–610

(56) References Cited

U.S. PATENT DOCUMENTS

| | | | |
|---|---|---|---|
| 3,893,166 A | 7/1975 | Pugsley ........................ | 358/80 |
| 4,275,413 A | 6/1981 | Sakamoto et al. ............. | 358/80 |
| 4,477,833 A | 10/1984 | Clark et al. .................... | 358/80 |
| 4,500,919 A * | 2/1985 | Schreiber ..................... | 358/518 |
| 4,511,989 A | 4/1985 | Sakamoto ..................... | 364/723 |
| 5,121,196 A | 6/1992 | Hung ........................... | 358/75 |
| 5,321,797 A * | 6/1994 | Morton ........................ | 345/431 |
| 5,343,311 A * | 8/1994 | Morag et al. ................. | 358/518 |
| 5,740,344 A * | 4/1998 | Lin et al. ..................... | 345/430 |

FOREIGN PATENT DOCUMENTS

| | | | | |
|---|---|---|---|---|
| GB | 1595122 | 8/1981 | ............ | H04N/1/40 |
| GB | 2260669 | 4/1993 | ............ | H04N/1/46 |

OTHER PUBLICATIONS

Hung, Color Rendition Using 3–Dimensional Interpolation, Jan. 12–13, 1988, pp. 111–115 Imaging Applications in the Work World, SPIE, vol. 900.

Stone et al., Color Gamut Mapping and the Printing of Digital Color Images, Oct., 1988, ACM Transactions on Graphics, vol. 7, No. 4., pp. 249–292.

Paeth, Algorithms for Fast Color Correction, 1989, pp. 169–175 Proc.for the Society for Invormation Display, vol. 30, No. 3.

Ikegami, New Direct Color Mapping Method for Reducing the Storage Capacity of Look–Up Table Memory, 1989, SPIE vol. 1075 Digital Image Processing Applications, pp. 26–31.

(Continued)

*Primary Examiner*—Thu V. Nguyen
(74) *Attorney, Agent, or Firm*—Jerry R. Potts

(57) ABSTRACT

A computerized method, containable in a computer memory device, is disclosed for tristimulus color space coordinate data nonlinear storage, retrieval, and interpolation, and, more specifically to memory mapping and data interpolation for 24-bit L*H*C* to 24-bit RGB color mapping (three 8-bit words to each coordinate). Predetermined output tristimulus color space coordinate data points are stored in nodes of a memory construct based upon use of input values of a cylindrical-based tristimulus color space coordinate system, where a non-linear selection of stored data points is provided in the memory construct. The number of linear interpolations of each of the coordinates is determined by the number of available bits in each data word after providing sufficient bits to address the surrounding stored nodes. Each coordinate conversion is expedited by caching frequently accessed nodes in an auxiliary cache memory, by node doubling of preselected nodes, and by fetching only relevant adjacent nodes during interpolation.

20 Claims, 5 Drawing Sheets

OTHER PUBLICATIONS

Kanamori et al., A novel color transformation algorith and its applications, Image Processing Algorithms and Techniques, Feb. 12–14, 1990, SPIE vol. 1244, International Society for Optical Enginner Proceedings, pp 272–.

Kanamori et al., Color Correction Technique for Hard Copies by 4–Neighbors Interpolation Method, pp. 73–80, Journal of Imaging Science & Technology, vol. 36, No. 1, Jan./Feb. 1992.

Hung, Colorimetric calibration in electronic imaging devices using a look–up table model and interpolations, Journal of Electronic Imaging, Jan. 1993, vol. 2(1), pp. 53–61.

Gennetten, RGB to CMYK conversion using 3–D barycentric interpolation, SPIE vol. 1909, Feb. 1–3, 1993 Proceedings: Device–Independent Color Imaging and Imaging Systems Integration, pp. 116–126.

Kasson et al., Atetrahedral interpolation technique for color space conversion, Id. @ pp. 127–138.

Kanamori et al., Fast color processor with programmable interpolation by small memory (PRISM); Journal of Electronic Imaging, Jul. 1993, vol. 2(3), pp. 213–224.

* cited by examiner

METHOD FOR INTERPOLATION OF TRISTIMULUS COLOR DATA

RELATED APPLICATIONS

This application is related to U.S. patent application Ser. No. 08/805,516 filed by the same applicants on this same date for a *Method for Tristimulus Color Data Non-linear Storage, Retreval, and Interpolation.*

BACKGROUND OF THE INVENTION

1. Field of the Invention

The present invention relates generally to colorimetry, more particularly to nonlinear tristimulus color data storage, retrieval and interpolation, and, more specifically to memory mapping and data interpolation strategy for 24-bit L*H*C* to 24-bit RGB space data.

2. Description of Related Art

Colorimetry has long been recognized as a complex science. Essentially, as defined in 1931 by the Commission Internationale L'Eclairage (CIE), three primary colors (X, Y, Z) can be combined to define all light sensations we experience with our eyes; that is, the color matching properties of an ideal trichromatic observer defined by specifying three independent functions of wavelength that are identified with the ideal observers color matching functions form an international standard for specifying color. In general, it has been found possible and convenient to represent color stimuli vectors by a three-dimensional spatial construct, called a *tristimulus* space or a color space. The fundamentals of such three-dimensional constructs are discussed in the literature, such as *Principles of Color Technology*, by Billmeyer and Saltzman, published by John Wiley & Sons, Inc., NY, copyright 1981 (2d. ed.) and *Color Science: Concepts and Methods, Quantitative Data and Formulae*, by Wyszecki and Stiles, published by John Wiley & Sons, Inc., copyright 1982 (2*d* ed.), see e.g., pages 119–130.

A variety of trichromatic model systems provide alternatives for both the hardware and software system designers— e.g., the red, green, blue (RGB) model commonly used in computer video displays; the cyan, magenta, yellow (and black) (CMY(K)) model used extensively in color hard copy apparatus; the hue, saturation, value (HSV) model; the hue, lightness, saturation (HLS) model; the luminance, red-yellow scale, green-blue scale (L*a*b*) model; the YIQ model used in commercial color television broadcasting; and others. Such works as *Fundamentals of Interactve Computer Graphics*, by Foley and Van Dam, Addison-Wesley Publishing Company, see e.g., pages 606–621, describe a variety of tri-variable color models.

Color input and output devices—such a scanners, cathode ray tube (CRT) video monitors, and printers—present color images in a device-ependent fashion. For example, CRT guns are driven by RGB values (voltage levels or other input signal functions, referred to hereinafter as data tiplets or color coordinates) that are stored in a frame buffer. Those RGB values index over the color space of each particular model video monitor; in other words, the color produced by a CRT on a pixel of its screen for a given RGB triplet of values is unique to that device. Because of device design dependency, the same RGB triplet may produce a very different color or hue when displayed on a different model CRT and still a different color in a hard copy made with a color printer.

Color transformation (also referred to in the art as color correction and cross-rendering) between model systems in digital data processing presents many problems to the original equipment manufacturer. The transformation of data from one device to another device is difficult because the color matching relationship between those systems are generally non-linear. Therefore, a crucial problem is the maintaining of color integrity between an original image from an input device (such as a color scanner, CRT monitor, digital camera, computer software/firmware generation, and the like) and a translated copy at an output device (such as a CRT monitor, color laser printer, color ink-jet printer, and the like). A transformation from one color space to another requires complex, non-linear computations in multiple dimensions. Since such is not describable mathematically, it is known to use very large look-up tables to approximate a transformation between trichromatic model systems to correlate the wide spectrum of color hues that exist. A lookup table of input versus output data can be generated for any set of devices. There are a variety of methods for building a device-dependent look-up table for a particular device. The 1975 U.S. Pat. No. 3,893,166 to Pugsley provides an example. However, semiconductor memory is relatively expensive and other data storage technologies for maintaining such tables—disks, tape, and the like—are too slow.

Bytes of data correlated in three dimensions can be represented as a construct, such as a polyhedral lattice, with each corner of a cube representing a data point, that is, a data set having coordinate values in each of the planes is stored in a memory location, or node, as a look-up table. [Note that in this art, the term node may seem to have multiple meanings because of the nature of multidimensional spatial constructs that are used in such systems; (1) it can refer to the coordinates of the space of an input pixel; (2) it can refer to stored data points between which interpolation of data may occur; (3) when a color data map of multi-dimensional color space is stored in a two-dimensional computer memory, it can refer to the memory address itself which has a one-to-one correspondence with the incoming pixel coordinates; (4) it can refer to the data stored at each memory location that represents the output pixel data which itself can refer to the coordinates of a second spatial point. The exact meaning of the term both in the art and in this specification thus often must be taken from the context in which it is used.] The total look-up table is made of many such cubes as shown in FIG. 1 for an RGB color space construct. However, to store a typical printer color transformation data point value for every monitor RGB value in a look-up table would require fifty megabytes or more of random access memory which is cost prohibitive in the state-the-art. Thus, it is economic to store only a limited number of data points and to use interpolation methods to derive intermediate data points within the lattice. In making the transform from one tristimulus system to another, trilinear or quadrilinear interpolation methods have been used. However, with non-linear data, true interpolation is time consuming and impractical when dealing with, for example, a print image comprising millions of pixels. Therefore, there are a variety of data storage and interpolation methods proposed in the art. The use of limited data for interpolation is described in U.S. Pat. No. 4,477,833 to Clark et al. A method of variable spacing of selected non-linear data and storing data in accordance with regard to the particular color curve is described by Morton in U.S. Pat. No. 5,321,797. An improved interpolation approximation by a lattice subdivision technique is taught by Gondek in U.S. patent application Ser. No. 08/504,406 (assigned to the common assignee of the present invention).

Transforming input data triplets into printer RGB (or CMY, or CMYK) values also can be accomplished by utilizing color measurement tools and device-independent color spaces. Device-independent color provides accurate color matching based on an absolute color standard, such as the CIE. A device-independent color space provides a way for describing the appearance of a color without referring to the mechanism that produced the color. For example:

first, a function is constructed that transforms RGB data points from the color space of a monitor (that is, the table of input-output correlations) into a device-independent color space, e.g., the CIE L*a*b* color space;

second, a function is constructed that transforms color data points from the device-independent color space, the CIE L*a*b* color space, into the color space of a particular printer; and using these two functions, the monitor RGB data values can be transformed to L*a*b* data triplets and the L*a*b* data triplets transformed into the printer data triplets, thus providing printer output that matches the original input image colors as viewed on the CRT monitor.

However, in addition to the data storage and access problems referred to above, the mapping of the monitor RGB values into printer RGB values is time intensive to perform on each and every colored pixel in an image before completely printing that image. Therefore, it is economic to pre-compute and store the output data triplets for a subset of input values and then to use a fast interpolation algorithm to approximate the transform function for intermediate output data values, i.e., those that have not been pre-computed and stored.

It is sometimes desirable to identify components of color differences in terms of correlates of chroma (relative colorfulness, saturation, e.g., a strong or weak brightness) and hue (color, as measured by wavelength). One specific tristimulus space construct, L*H*C*, uses luminance (directional intensity; reflectance or transmittance; "Y" in the CIE standard tristimulus coordinate system), hue, and chroma, generally referred to as simply "LHC," is cylindrical as shown in FIGS. 2A and 2B, where FIG. 2B depicts a hue-chroma plane of constant luminance, hue changing along circles of constant chroma. The entire color map consists of these planes stacked on top of each other.

A scanner produces device-dependent RGB data. It is desirable for an end user to be able to have output print control, but the output data will also be in RGB or CMYK data, also device-dependent. Data control, and hence output control, can be provided in a color space only where there is independence of the variables (e.g., in RGB, adjusting R would affect any color hue that has a red component, not just red, and both luminance and chroma; similarly with L*a*b* attempted control). Thus, control can only be done in a color space that will not create shifts in other variables. Luminance, L*, hue, H*, and chroma, C* are independent variables. Therefore, it is advantageous to transform RGB input data through a LHC construct because any of the variables can be adjusted independently and thus are readily adaptable to end-user hardware and software preference controls.

To provide a memory having each and every output value available in a transformation from a 24-bit LHC coordinate system (i.e., three 8-bit words) to a 24-bit RGB coordinate system again would require a very large memory to contain a look-up table to correlate the wide spectrum of color hues available. This solution is commercially impractical.

Thus, there is a need for an efficient mechanism for the nonlinear tristimulus color data storage, retrieval and interpolation when converting from a cylindrical LHC color space construct to a rectangular RGB color space construct.

There is also a need for a fast and economical method for storing and fetching limited points of an output data table and interpolating the stored data to obtain a proper transform between multi-variable data processing systems.

There is a need for an improved process that transforms the color values from one particular device color space into the color space of another device in a fast, economical manner.

SUMMARY OF THE INVENTION

In its basic aspects, the present invention provides a computerized method for interpolating tristimulus color space data stored in a memory emulating a color space having a tri-variable coordinate cylindrical construct, the data stored as multi-bit data words in the memory constituting tri-variable coordinates of a color space construct having a polyhedral construct, the method comprising the steps of:

storing a color map in the memory, the memory having a predetermined set of nodes, and each of the nodes being an addressable designate of three axial coordinates, X, Y and Z, of the cylindrical construct, where X = a radial axis vector, Y = a circumferential axis vector, and Z = a longitudinal axis vector;

receiving a set of three variables as three data words including bits designating a position in the cylindrical construct other than a specific node;

retrieving adjacent stored map nodes surrounding the position, retrieved nodes constituting a sub-construct of the stored color space construct;

determining which of bits in each of the three axial coordinates designate interpolation iterations, and setting a bit count for each to base log 2 of a difference between the adjacent stored respective map nodes values, respectively;

reducing the sub-construct iteratively in each axial vector in three, two, or one dimensions toward the position in the cylindrical construct based upon the relation of the count of bits for designating interpolation iterations, respectively, until all counts equal zero;

outputting coordinates determined from the step of reducing.

The invention also provides for a computer device having a program for interpolating data, the program comprising the steps of:

storing a map of tristimulus color space data in a memory emulating a color space having a tri-variable coordinate cylindrical construct, the data stored as multi-bit data words in the memory and constituting tri-variable coordinates of a color space construct having a polyhedral construct, the memory having a predetermined set of nodes, each of the nodes being an addressable designate of three axial coordinates, C, H and L, of the cylindrical construct, where C = a radial axis vector, representing chroma values of a tristimulus color space, H = a circumferential axis vector, representing hue values of a tristimulus color space, and L = a longitudinal axis vector, representing luminance values of a tristimulus color space;

receiving a set of L,H,C variables as three multi-bit data words including bits of each word designating a point in the cylindrical construct other than a specific node, remainder bits of each word designating interpolation iterations;

retrieving adjacent stored map nodes surrounding the point, retrieved nodes constituting a sub-construct of the stored color space construct;

determining which bits in each of the three axial coordinates designate interpolation iterations, and setting a count for iteration bits of each data word to base log 2 of a difference between the adjacent stored respective map nodes values, respectively;

sequentially comparing iteration bit counts of the three axial coordinates for identity;

reducing the sub-construct iteratively in each axial vector in three, two, or one dimensions toward the point based upon the relation of counts of bits for designating interpolation iterations among the three axial coordinates, respectively, sequentially and iteratively reducing count bits and repeating the step of reducing the sub-construct until all counts equal zero;

determining interpolated output data words for the point of the cylindrical construct when the counts equal zero;

outputting coordinates determined from a last step of reducing the subconstruct.

It is an advantage of the present invention that it provides a data conversion methodology where a reduced number of data mapping nodes can be stored.

It is a further advantage of the present invention that it provides a mapping strategy of color data nodes allowing greater control in certain aspects of the color space.

It is a further advantage of the present invention that it provides a data fetching mechanism where a minimum set of surrounding data points need only be used for data interpolation, reducing the data bandwidth needed to access data storage.

It is still another advantage of the present invention that it allows pixel encoding which allows extra color processing information to be encoded and provided to downstream blocks.

Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable. While the preferred embodiment is described with respect to an exemplary RGB scanner to RGB printer data transform, it will be recognized by a person skilled in the art that the methodology is readily adaptable to other transforms. While it is the intent of the inventors that the preferred embodiment of the present invention be implemented in an application specific integrated circuit ("ASICS"), it will also be recognized that software or other implementations can be designed based upon this disclosure. Therefore, no limitation on the scope of the invention is intended by the use of the exemplary embodiments nor should an such intention be implied.

Memory mapping

Figure 3:
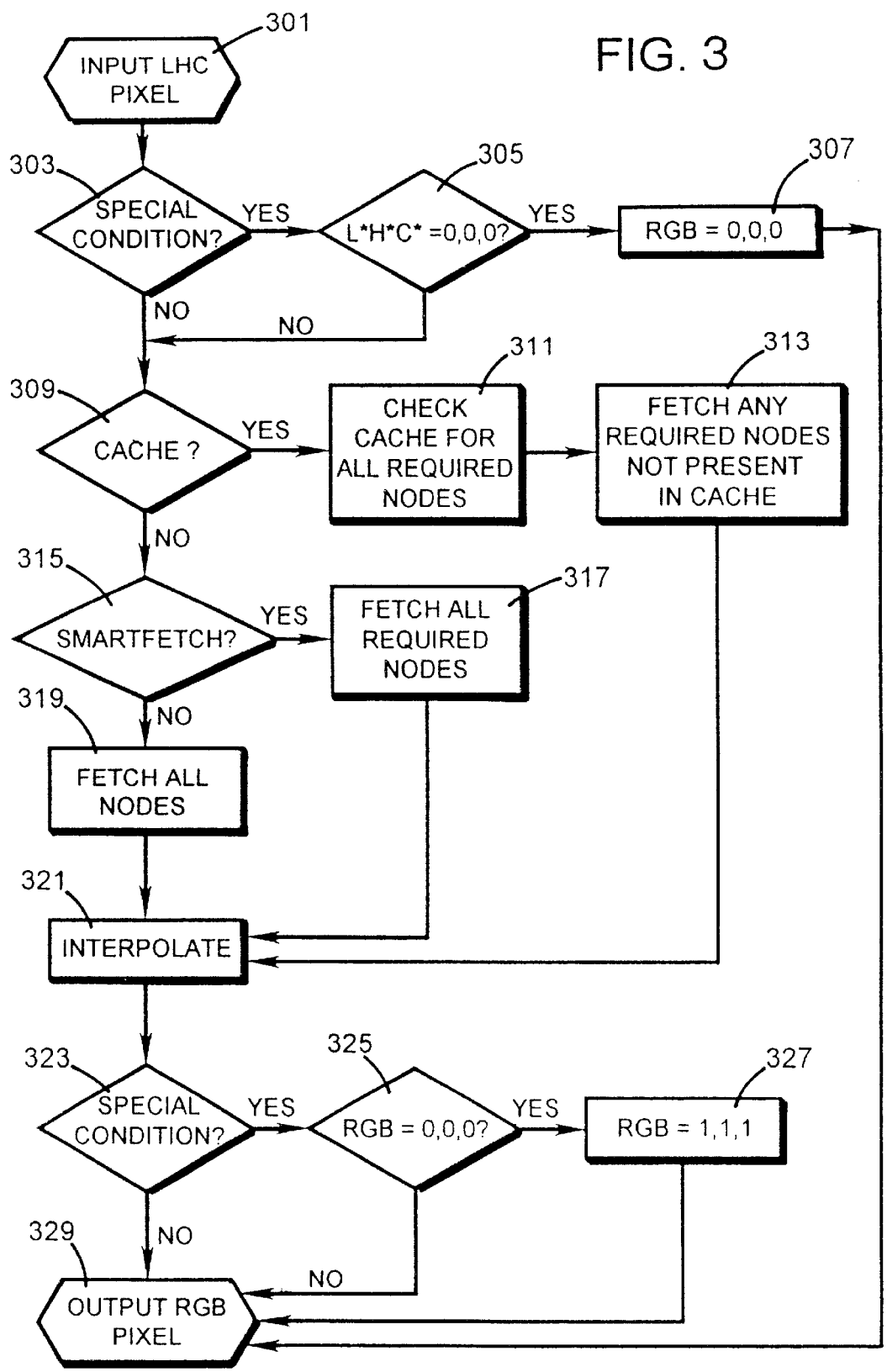
FIG. 3 is a flow chart of a method of color mapping and color space data transformation in accordance with the present invention.

Turning to FIG. 3, it is assumed that RGB scanner data has been converted (by any technique as would be known in the state of the art) to LHC data for each pixel of the scanned image. Luminance, hue and chroma control have been provided to the user. It is now necessary to transform LHC input data back into a data triplet recognizable by the printer, e.g., RGB or CMY(K) data. Each triplet of input LHC pixel data is received sequentially, 301.

At this point, it is possible to inject any special instructions, or checks, into the routine, 303. For example, the user may have specified a special print media, such as glossy paper, is in use. If the special condition is true ("Y"), a special check of the condition and processing accordingly is implemented. So in this example, if a glossy media mode has been selected, the check is made to see if LHC is for coordinate "0,0,0", 305; if so, RGB is also set to "0,0,0" and output, 329. This may be a reserve indicator that text printing is in process. If the LHC is not "0,0,0", 305 "N," or the special condition is not true, 303, "N," then the process continues. This subroutine will be explained further with respect to the interpolated data output. First, however, it is important to understand the rules for retrieving predetermined stored data from the color map, also referred to as "node fetching" and the interpolation process flow.

As discussed at length in the Background of the Invention section, to provide a memory having each and every output value available in a transformation from a 24-bit LHC coordinate system (i.e., three 8-bit words) to a 24-bit RGB coordinate system would require a very large memory to contain a look-up table, e.g., fifty megabytes, to correlate the wide spectrum of color hues available. In accordance with the color mapping of the present invention, only a set of predetermined, RGB output data points are stored in nodes of an addressable memory based upon use of input values of the LHC cylindrical-based color space coordinate system. The information stored for each node consists of three bytes, one each for the RGB output values. In order to expedite fetching of data and to decrease memory bus utilization for memory mapping and interpolation from a 24-bit LHC input to a 24bit RGB output, it has been determined that only the following nodes of correlative data needs to be stored:

TABLE 1

| Axis | Number of Nodes | Node Placement (0–255) |
| --- | --- | --- |
| Luminance (L*) | 17 | 0, 16, 32, 48, 64, 80, 96, 112, 128, 144, 160, 176, 192, 208, 224, 240, 255 |
| Hue (H*) | 30 | 0, 8, 16, 24, 32, 40, 48, 56, 64, 72, 80, 88, 96, 104, 112, 128, 136, 144, 160, 168, 176, 184, 192, 200, 208, 216, 224, 232, 240, 248 |

TABLE 1-continued

| Axis | Number of Nodes | Node Placement (0–255) |
| --- | --- | --- |
| Chroma (C*) | 13 | 0, 4, 8 12, 16, 24, 32, 48, 64, 96, 128, 192, 255 |

Note that this is only one color map of many that can be derived for a particular implementation. Selection of nodes can be accomplished with the following rules: Assume a set of M points {N(0), N(1) ... N(M)}, selected from a possible $2^K$ [i.e., the range from 0 to $(2^K)$–1]. This set of nodes will be valid for use with the interpolation methodology of the present invention if and only if the following are all true:

1. N(0)=0,
2. N(M)=$(2^K)$–1 [for further rule checking, N(M) can fill the $2^K$ value, and
3. For nodes {N(1), N(2), . . . , N(M–1)}, the node N(P)=Q*$(2^R)$, where Q is an odd number] can be a member of the set only if ((Q–1)*$(2^R)$), and ((Q+1)*$2^R$)) are also included in the set.

If the axis is describing an angle, such as for H* axis, the rules are:

1. N(0)=0 [for further rule checking, N(0) can fill both the 0 and $2^K$ values], and
2. For nodes {N(1), N(2), . . . , N(M–1)}, the node N(P)=Q*$(2^R)$, where Q is an odd number, can be a member of the set only if ((Q–1)*$(2^R)$), and ((Q+1)*$(2^R)$) are also included in the set.

Note also that in this particular map for cylindrical space, since H* is a circumferential vector, note that a special wrap occurs where node 265 would have come full circle and equal node 0. It would be of course possible to store the same data in separate locations as node 0 and node 256; in the preferred embodiment, it is merely stored once and handled algorithmically.

Figure 5:
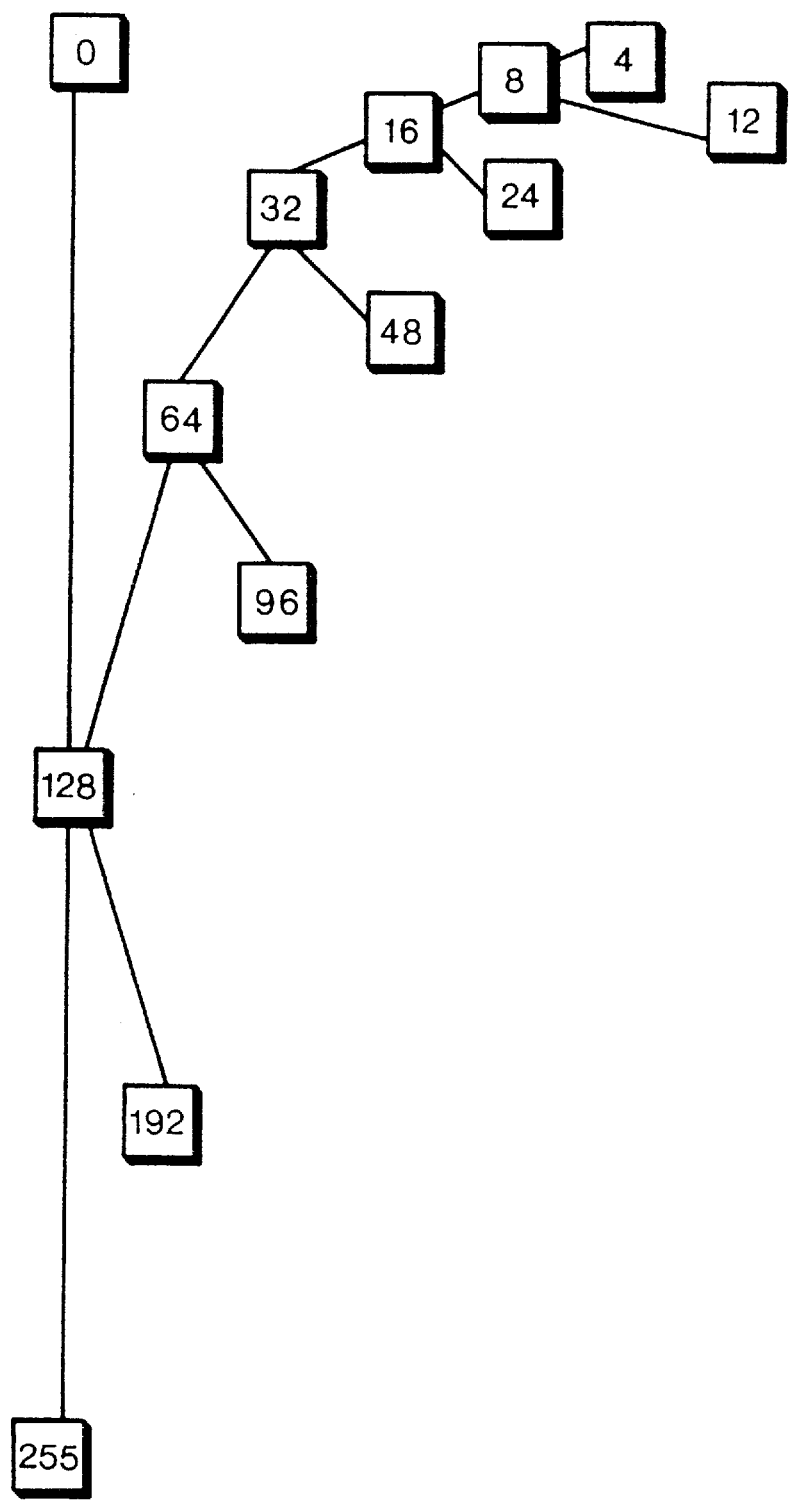
FIG. 5 is a depiction of the mapping strategy for nodes of the chroma coordinates of the present invention as an adjunct to TABLE 1.

In this preferred embodiment, while data for L* is regularly spaced throughout the available spectrum (TABLE 1, every 16 nodes being provided), in order to provide user control in light shades of color, e.g., pastels where differences are readily apparent and harder to control—that is low chroma value data, C*—are stored more frequently in low chroma space (TABLE 1, a non-linear progression of: 0, 4, 8, then 16, 24, 32, then 48, 64, then 96, 128, then 192, then 255). This is also depicted in FIG. 5, where the data distribution toward low chroma nodes is dramatically greater than for colors of low chroma value.

Figure 2A:
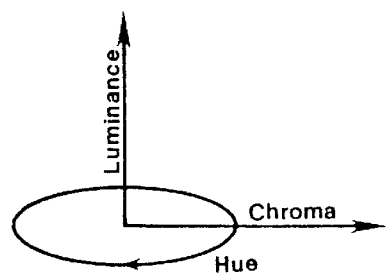
FIGS. 2A and 2B (Prior Art) are schematic depictions of a L*H*C* color space construct.
Figure 2B:
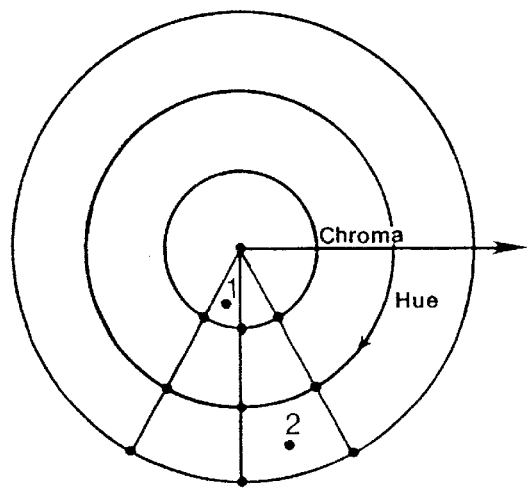

When C*=0, the color map does not distinguish among the different values of H* (see FIGS. 2A and 2B). Thus, a total of 6137 color map nodes [17+(17×30×12)=6137], ranging throughout the 24-bit LHC color space are required. In other words the entire color map consists of the hue-chroma planes spaced according to the seventeen L* node specifications.

Data fetching modes

Figure 1:
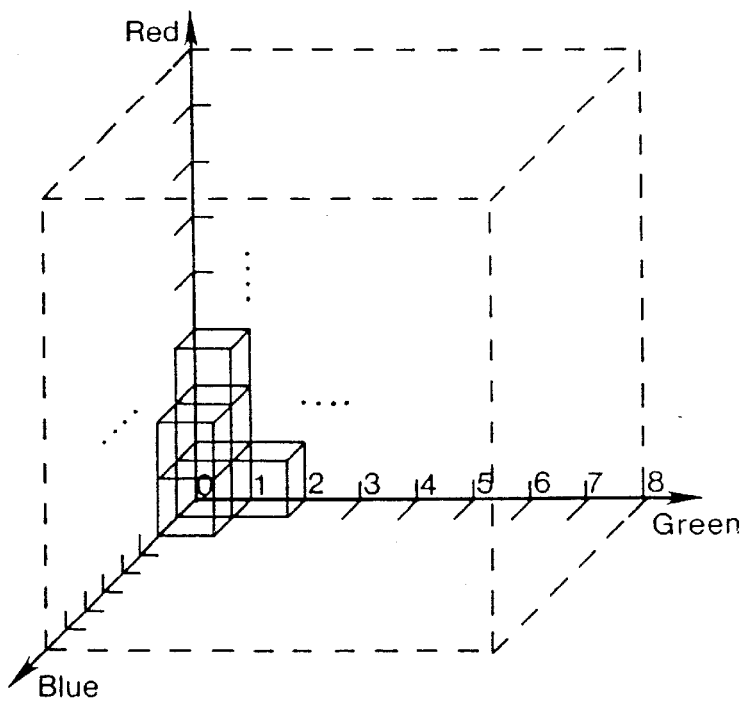
FIG. 1 (Prior Art) is a schematic depiction of a color space construct for RGB data.

Ignoring for a moment the improved data fetching steps 309–317 of the present invention as shown in FIG. 3, a simple fetching of all adjacent nodes operation 319 is exemplified by the following rules and examples.

Where there is no perfect match of all three of the LHC input coordinates to a specifically mapped node, to perform an interpolation of data this is available in memory, it would seem that the default number of nodes to be fetched would be eight, all of the surrounding stored nodes of adjacent planes of a polyhedron of a color space construct defined by the fetched nodes (see e.g., FIG. 1). To determine which eight nodes to fetch a comparison of the three LHC components of the incoming pixel 301 with the map node locations, TABLE 1 is required. For each of the three components, the map node locations which is less than or equal to the incoming pixel component is determined. Once these three values are determined, the next largest index for each component are determined. Once these six values, two for each component, are determined, you can use the eight possible combinations to find the eight default map nodes from which the correlative RGB 5 data is to be fetched.

However, it has been determined that this part of the process can be simplified by recognizing the nature of the nodes stored the map (TABLE 1) and the nature of the cylindrical LHC space construct itself. Thus, the present invention uses a "smart-fetch" subroutine, 315–317, whenever possible.

With regard to the nature of the color map, if any one of the components of the incoming pixel value exactly matches one of the map node indices, only half the number of fetches required. That is, in a smart-fetch, it can be recognized what an input pixel is and determine which nodes are need such that, depending upon the input color coordinates and their alignment with planes of the sample nodes, all eight surrounding nodes may not be needed. When a match occurs, it limits the choices for that component from two to one to figure out what nodes to fetch. In other words, if no components provide a match, all eight nodes must be fetched; if one component matches, four nodes must be fetched; if two components match, two nodes must be fetched; and if all three components match, only one node must be fetched.

With regard to the nature of cylindrical space itself, two special cases occur when C*=0 and when C* is greater than 0 but less than the next map index node (e.g., 0<C*<4, TABLE 1). If C*=O, H* is irrelevant (see FIGS. 2A and 2B). Then, if the L* component is a mapped plane, only one node is required; if the L* component is not a mapped plane, two nodes are required. If C*>0 but less than the next map index node, only six nodes are required, For example, suppose that an input LHC pixel 301 has L*=56, and H*, C* coordinates such that its projection in the H*-C* plane of FIG. 2B falls into an area like the one containing pixel number 1 data. There is no data stored for L*=56 (see Table 1), therefore interpolation 321 must be performed from the stored data. To interpolate 321 from given memory data, three appropriate nodes in both the adjacent planes L*=48 and L*=64 planes that describe a pie-shaped polyhedron are required. Again, note that where L* is an exact match, only the three nodes in that plane need to be fetched.

Fetch mode examples for Table 1 color map

If the incoming data triplet is (20,20,20), then eight nodes are needed:

(16,16,16)
(16,16,24)
(16,24,16)
(16,24,24)
(32,16,16)
(32,16,24)
(32,24,16) and
(32,24,24).

If the incoming data triplet is (48,50,52), then four nodes are needed:

(48,48,48)
(48,48,64)
(48,56,48) and
(48,56,64).

If the incoming data triplet is (104,104,104), then four nodes are needed:
(96,104,96)
(96,104,128)
(112,104,96) and
(112,104,128).

If the incoming data triplet is (4,4,4), then four nodes are needed:
(0,0,4)
(0,8,4)
(16,0,4) and
(16,8,4).

If the incoming data triplet is (144,144,144), then two nodes are needed:
(144,144,128) and
(133,144,192).

If the incoming data triplet is (64,196,64), then two nodes are needed:
(64,192,64) and
(64,200,64).

If the incoming data triplet is (100,96,96), then two nodes are needed:
(96,96,96) and
(112,96,96).

If the incoming data triplet is (96,96,96), then one node is needed:
(96,96,96)

If the incoming data triplet is (8,8,0), then two nodes are needed:
(0,_,0) and
(16,_,0).

If the incoming data triplet is 48,24,0, then one node is needed:
(48,_,0).

If the incoming data triplet is (70,70,1), then six nodes are needed:
(64,_,0)
(80,_,0)
(64,64,4)
(64,72,4)
(80,64,4) and
(80,72,4).

If the incoming data triplet is (250,240,2), then four nodes will be needed:
(240,_,0)
(255,_,0)
(240,240,4) and
(255,240,4).

If the incoming data triplet is (160,165,3), then three nodes will be needed:
(160,_,0)
(160,160,4) and
(160,168,4).

Note particularly for the H* value, since the cylindrical space position is determined by a circumferential angle that node 256 would equal node 0. Thus, if the incoming data triplet is (250,250,250), eight nodes will be needed:
(240,248,192)
(240,248,255)
(240,0,192)
(240,0,255)
(255,248,192)
(255,248,255)
(255,0,192) and
(255,0,255).

If the incoming data triplet is (180,252,2) then 6 nodes will be needed:
(176,_,0)
(176,248,4)
(176,0,4)
(192,_,0)
(192,248,4) and
(192,0,4).

Memory mapping, continued: node doubling

Direct memory access bandwidth must be considered in a system design. For example, each node may comprise 24-bits of data but the bus architecture may be only 16-bits wide. In retrieving two nodes, 48-bits of data, a multiple of sixteen is amenable to a straight storage methodology. Storing in sequence as shown in TABLE 2 is acceptable if this were always the case. However, as shown above, the smart-fetch methodology will not always match the bus architecture. Node doubling in memory provides a solution. That is, in order to expedite fetches and decrease DMA bus utilization, most nodes of the color map appear in main memory more than once. The understanding of node doubling comes from an understanding of the nature of the storage and retrieval of the type of data being used in color space transformation. Returning to the original default mode fetch of eight nodes, a pixel such as number 2 in FIG. 2B would require such eight adjacent nodes, four from each of the available adjacent L* planes. As another example, if the input pixel 301 has L*=72, with identical H* and C* values as the first example, the same L*=64 nodes are required along with the relevant L*=80 nodes (rather than the L*=48 nodes). If data were stored once into a conventional sequential memory, all nodes exist only in one addressable location and a the color map having a hardware convenient 16-bit/word structure, a small segment of which is shown in TABLE 2, would require redundant access steps.

TABLE 2

| Address Offset | Data Word |
| --- | --- |
| ... | ... |
| n | R(L32HC) G(L32HC) |
| n + 1 | B(L32HC) R(L48HC) |
| n + 2 | G(L48HC) B(L48HC) |
| n + 3 | R(L64HC) G(L64HC) |
| n + 4 | B(L64HC) R(L80HC) |
| n + 5 | G(L80HC) B(L80HC) |
| ... | ... |

For example the L*=56 pixel requires fetching n+1, n+2, n+3 and n+4, while the L*=72 pixel requires only n+3, n+4, and n+5. Node doubling as shown in TABLE 3 reduces the fetch requirement.

TABLE 3

| Address Offset | Data Word |
| --- | --- |
| ... | ... |
| n | R(L48HC) G(L48HC) |
| n + 1 | B(L48HC) R(L64HC) |
| n + 2 | G(L64HC) B(L64HC) |
| n + 3 | R(L64HC) G(L64HC) |
| n + 4 | B(L64HC) R(L80HC) |
| n + 5 | G(L80HC) B(L80HC) |
| ... | ... |

Now in the original example, with the required data in two locations, for both L*=56 and L*=72 only three fetch accesses are required.

Note that not all nodes must be doubled in memory. Most planes of constant L* have two neighboring planes; but for L*=0 and L*=255, only one neighboring plane exists, thus the nodes on these two planes need not be duplicated. [However, if convenient to a specific implementation, e.g., where an address generation scheme may require, three stores of an axial limit node, e.g., 255, may be implemented.] Therefore, for every group of seventeen L* nodes (see TABLE 1), there are thirty-four, three-byte mappings in main memory. The actual ordering of nodes within main memory can be optimized based upon design expedients for the hardware employed. One methodology is described in co-pending U.S. patent application Ser. No. 08/375,096 by A.R. Jones for a *Memory Organization and Method for Multiple Variable Digital Data Transformation*, assigned to the common assignee of the present invention and incorporated herein by reference.

Caching In order to speed data processing, it has been found that the use of an ASIC on-board cache memory substantially improves data processing time. That is, it is faster to retrieve data nodes from a cache if the color map is kept offboard the data processing ASIC in general memory. Returning to FIG. 3, it has been found that the use of an ASIC on-board cache memory can also be used to provide a more efficient fetching methodology. That is, data fetched for a current transformation are cached and remain in the cache memory until the next transformation cycle. Therefore, prior to determining if "smart-fetching" 315–317 is appropriate, a cache check is performed 309–313 to determine if the nodes have been retrieved during data transformation from LHC to RGB data in a prior transform cycle. If a cache is enabled, 309 "Y," then the cache memory is checked, for all the input data requested nodes, 311. If not all nodes are found in the cache, the remainder are fetched from main memory, 313, replacing node data not needed for the current transform cycle. In the preferred embodiment, it has been explained that there are seventeen L* value nodes, thirty H* value nodes, and thirteen C* value nodes in the color map (TABLE 1). An appropriate size and addressing scheme for cache memory can be devised for holding data in a set-associative manner as would be known to a person skilled in the art. If all the nodes addressed by the current input LHC pixel coordinates are already in the cache 311, 313, then step 315–319 can be bypassed.

Interpolation methodology

Figure 4A:
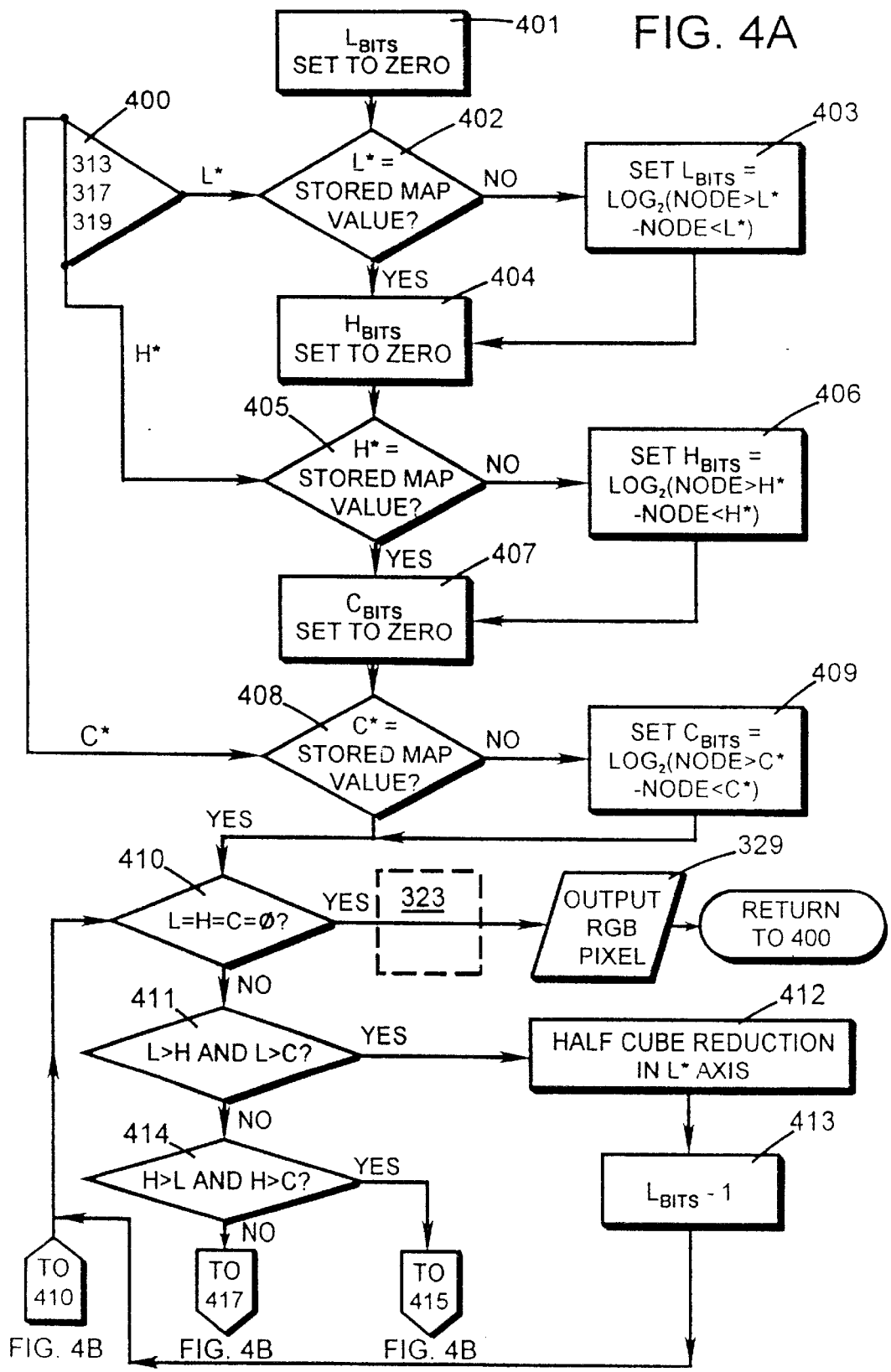
FIGS. 4A and 4B (a continuation of 4A) is a flow chart of an interpolation methodology in detail of the flow chart as shown in FIG. 3.
Figure 4B:
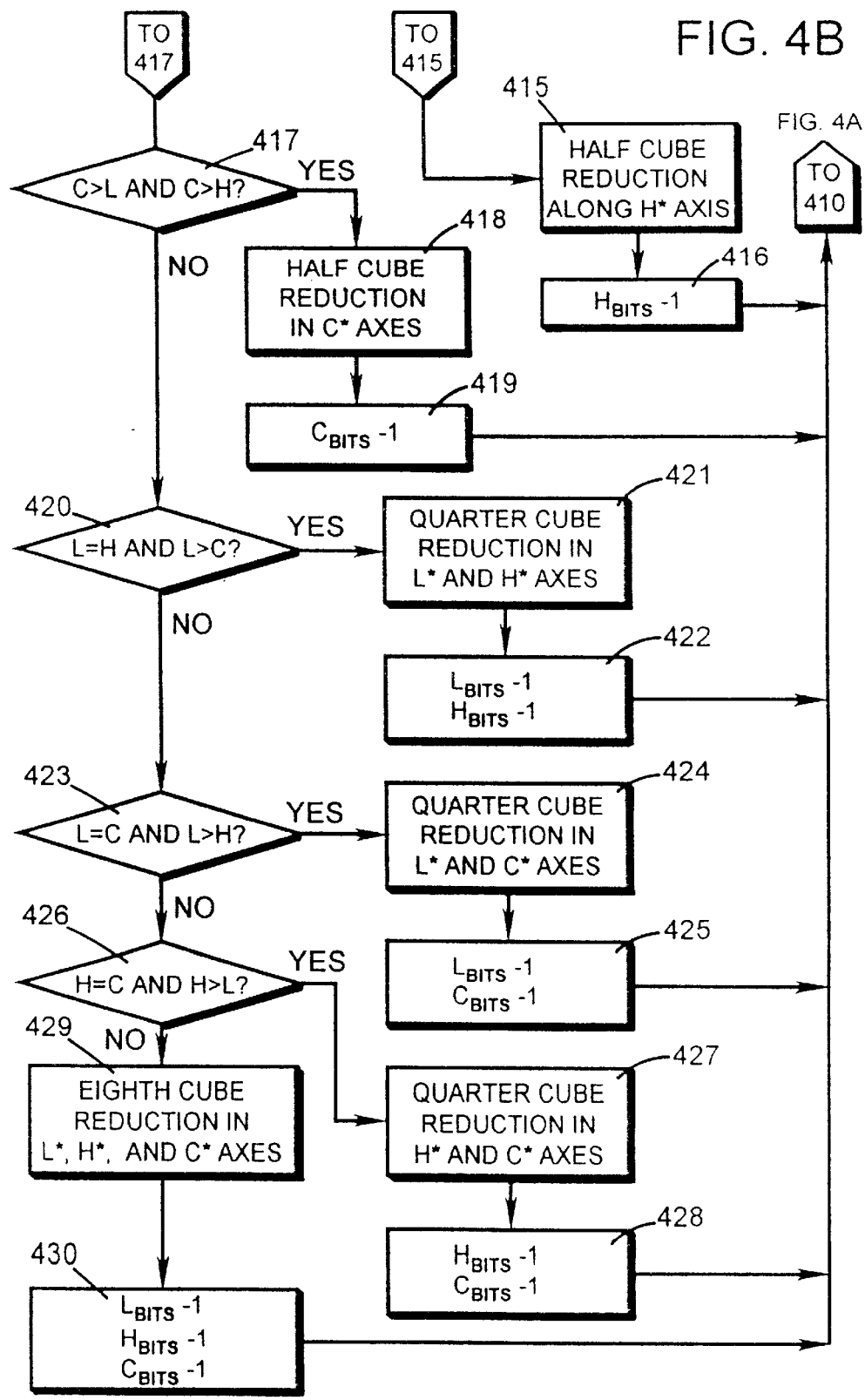

In summary, the first step of a data transformation and interpolation from LHC color space input data 301 to RGB (or other device-dependency) color space output data 329 is to determine which of the color map nodes describe the smallest polyhedron, or "subcube," that encloses the input pixel. The second step is the fetching 315–319 of the data stored at those relevant nodes. The third step is the actual interpolation calculation 321; that is, the data of the fetched nodes are interpolated as needed to produce a corresponding 24-bit RGB output value 329 correlated to the input LHC pixel data 301. The interpolation subroutine 321 is shown in FIGS. 4A and 4B.

A set of output RGB coordinates from the input LHC coordinates is to be derived. As in the Gondek U.S. patent application, supra, it has been determined that a division of the lattice of data points by subdivision routines is more efficient than attempting the complex mathematics of a true non-linear, tri-variable, interpolation. However, in the Gondek methodology, all surrounding nodes are always required. As explained heretofore, in the present invention the input LHC coordinate values 400 will come from either cache memory (see FIG. 3, steps 309–313) or main memory by a smart-fetch (steps 315–317) or a full fetch of all surrounding nodes (step 319). Thus, based on the number and position in the color space construct of the fetched nodes, the interpolation routine can be improved.

Depending upon the color map (see TABLE 1 and FIG. 5), in an 8-bit L*, H* or C* coordinate word, a certain number of bits are required for designating the target node and the remainder of the bits determine the number of subdivisions available.

For example, if the input LHC =8,4,7, the L* coordinate falls between the 0 and 16 nodes stored (see TABLE 1). Therefore, of the 256 node possibilities (zero to 255), using a base two logarithm (hereinafter "$\log_2$") of the difference between the nodes being 16, 4-bits of the 8-bit word are needed for memory access addressing (256/16=16). The H* coordinate falls between the 0 and 8 nodes stored. Therefore 5-bits are needed (256/8=32). The C* coordinate falls between the 4 and 8 nodes stored. Therefore, 6-bits are needed (256/4=64). Using the same example, this partitioning of the data words can be depicted as:

L*,H*,C* [8,4,7] where

L is XXXX|XXXX

H is XXXX X|XXX

C is XXXX XX|XX.

Let $L_{bits}$, $H_{bits}$, and $C_{bits}$ be understood to mean the number of bits available for an interpolation division; in the example $L_{bits}=4$, $H_{bits}=3$, and $C_{bits}=2$; where bit count is label starting with the least significant bit ("LSB") and increasing by one for each position toward the most significant bit ("MSB"). The number of interpolations is thus determined by the coordinate having the most number of bits available, in this example, for four interpolations: (1) L*; (2) L*, H*; (3) L*,H*,C*; and (4) L*,H*,C* again. [Note that in this particular exemplary embodiment, that in determining e.g. $L_{bits}$, there is an exception when the upper node point represents 255; e.g., for L*=244, the adjacent nodes are 240 and 255; $L_{bits}=\log_2((255-244)+1)=4$.] Additionally, the $\_^*{}_{bits}$ variable should have a ceiling function applied to them after the $\log_2$ operation. That is, the equation is:

$$\_^*{}_{bits} = \text{ceiling}(\log_2(\_^*\text{node 1}-\_^*\text{node 0}),$$

where the ceiling$_N$ is the smallest integer which is greater than or equal to "N."

In the routine as shown in FIGS. 4A and 4B, first, the $L_{bits}$ count is set to zero, step 401. The incoming L* value is checked to determine if it coincides with a stored map node, step 402. If the condition is false (step 402, "N"), $L_{bits}$ is set to the $\log_2$ of the difference between the adjacent map node values (that is, the next lesser numbered node and the next greater numbered node; e.g., for L*=8, $\log_2(16-0)$, step 403. If true (step 402, "Y"), or after step 403, the process proceeds, setting the $H_{bits}$ to zero, step 404, and running a similar routine with the hue coordinate. The incoming H* value is checked to determine if it coincides with a stored map node, step 405. If the condition is false (step 405, "N"), $H_{bits}$ is set to the $\log_2$ of the difference between the adjacent map node values, step 406. If true (step 405 "Y"), or after step 404, the process proceeds, setting the $C_{bits}$ to zero, step 407, and running a similar routine. The incoming C* value is checked to determine if it coincides with a stored map node, step 408. If the condition is false (step 408, "N"), $C_{bits}$ is set to the $\log_2$ of the difference between the adjacent map node values, step 409. If true (step 408 "Y"), or after step 408, the next stage of the process is begun.

If $L_{bits}$, $H_{bits}$, and $C_{bits}$ are zero, 410, meaning all three coordinates are specific map nodes, no interpolation is necessary, the nodes can be fetched and output, step 329 (see also FIG. 3). [A second special code check point, 323, will be discussed in further detail below.] If not, an interpolation is run. $L_{bits}$, $H_{bits}$, and $C_{bits}$ are compared, step 411. If the condition $L_{bits} > H_{bits}$ AND $L_{bits} > C_{bits}$ is true (step 4111, "Y"), based on the bit in the $L_{bits}$ position of the incoming L* value, a half cube reduction toward the designated position in color space along the L* axis is performed, step 412. That is, a subdivision between planes is taken to move in the L* axis toward the true color space point, or coordinate, desired. $L_{bits}$ is reduced by one, step 413; meaning in the example that only 3-bits of the original 4-bits interpolation designator bits remain. The routine returns to step 410 and continues. If the condition of step 411 was false (meaning no interpolation of L* necessary at this level of interpolation), a next comparison is performed.

If $H_{bits} > L_{bits}$, AND $H_{bits} > C_{bits}$, step 414, is true, based on the bit in the $H_{bits}$ position of the incoming H* value, a half cube reduction along the H* axis is performed, step 415; again, moving toward the position in color space where the hue coordinate transform is. $H_{bits}$ is reduced by one, step 416. The routine loops again to step 410 and continues. If the condition of step 414 was false, a next comparison is performed.

If $C_{bits} > L_{bits}$ AND $C_{bits} > H_{bits}$, step 417, is true, based on the bit in the $C_{bits}$ position of the incoming C* value a half cube reduction in the C* axis is performed, step 418. $C_{bits}$ is reduced by one, step 419, and the routine again returns to step 410. If the condition of step 417 is false and next level comparison begins.

If $L_{bits} = H_{bits}$ AND $L_{bits} > C_{bits}$, step 420, based on the bit in the $L_{bits}$ position of the incoming L* value and the bit in the $H_{bit}$, position of the incoming H* value, a quarter cube reduction along the L* and H* axes is taken, step 421. $L_{bits}$ and $H_{bits}$ are reduced by one each, step 422, and the process returns to step 410. If the condition of step 420 is false, another comparison test is performed.

If $L_{bits} = C_{bits}$ and $L_{bits} > H_{bits}$, step 423, based on the bit in the $L_{bits}$ position of the incoming L* value and the bit in the $C_{bits}$ position of the incoming C* value, a quarter cube reduction along the L* and C* axes is performed, step 424. $L_{bits}$ and $C_{bits}$ are each reduced by one, step 425, and the process returns to step 410. If the condition of step 423 is false, the next comparison is made.

If $H_{bits} = C_{bits}$ AND $H_{bits} > L_{bits}$, step 426, based on the bit in the $H_{bits}$, position of the incoming H* value and the bit in the $C_{bits}$ position of the incoming C* value, a quarter cube reduction along the H* and C* axes is performed, step 427. $H_{bits}$ and $C_{bits}$ are reduced by one each, step 428, and the process returns to step 410. If the condition of step 426 is false, an eight cube reduction in L*, H* and C* axes is taken, step 429. $L_{bits}$, $H_{bits}$, and $C_{bits}$ are all reduced by one, step 430, and the process returns to step 410.

The interpolation process proceeds until the condition of step 410 is satisfied. The next input LHC pixel can then be processed and so on until the entire transform from LHC to RGB is completed.

Returning to FIG. 3, following the interpolation subroutine, another special condition check 323–327 can be performed where, as before, reserved values can provide a special output useful to other operational aspects of the apparatus.

The present invention thus provides a color space data mapping strategy and interpolation methodology for transforming from L*H*C* input pixel coordinate values to RGB (or other tristimulus system) output pixel values. Non-linear color space data mapping and improved interpolation provide a more efficient multi-variable data transform. The output values are then used in displaying (for example with a hard copy apparatus providing a color print) the transformed data. In an ink-jet printer, the output values would be used to drive a print head controller to then deposit appropriate drops of color ink onto a print medium to achieve a dot matrix representation of the image. To configure and utilize a map in accordance with the present invention: a map is stored in main memory; the cache is cleared and the input register purged; and appropriate ENABLE bits for set for the special conditions, cache, and smart-fetch subroutines. Processing of input LHC pixel data can then proceed until the whole image is transformed.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A computerized method for interpolating tristimulus color space data stored in a memory emulating a color space having a tri-variable coordinate cylindrical construct, said data stored as multi-bit data words in the memory constituting tri-variable coordinates of a color space construct having a polyhedral construct, the method comprising the steps of:

storing a color map in said memory, said memory having a predetermined set of nodes, and each of said nodes being an addressable designate of three axial coordinates, X, Y and Z, of said cylindrical construct, where X=a radial axis vector, Y=a circumferential axis vector, and Z=a longitudinal axis vector, receiving a set of three variables as three data words including bits designating a position in said cylindrical construct other than a specific node;

retrieving adjacent stored map nodes surrounding said position, retrieved nodes constituting a sub-construct of said stored color space construct;

determining which of bits in each of the three axial coordinates designate interpolation iterations, and setting a bit count for each to base log 2 of a difference between the adjacent stored respective map nodes values, respectively;

reducing said sub-construct iteratively in each axial vector in three, two, or one dimensions toward said position in said cylindrical construct based upon the relation of the count of bits for designating interpolation iterations, respectively, until all counts equal zero;

outputting coordinates determined from said step of reducing.

2. The method as set forth in claim 1 wherein said step of reducing further comprises the steps of:

where $X_{bits}$ is the bit count for X input data word, $Y_{bits}$ is the bit count for Y input data word, and $Z_{bits}$ is the bit count for Z input data word, a. comparing $Z_{bits}$ to $X_{bits}$ to $Y_{bits}$;

b. when $Z_{bits}$ is greater then $Y_{bits}$ and $Z_{bits}$ is greater than $X_{bits}$, performing a half polyhedral reduction in said Z axis toward said position;

c. reducing $Z_{bits}$ by one; and d. repeating steps a., b. and c. until step b. condition is false.

3. The method as set forth in claim 2 further comprising the steps of:

e. comparing $Z_{bits}$ to $X_{bits}$ to $Y_{bits}$;

f. when $Y_{bits}$ is greater then $Z_{bits}$ to $Y_{bits}$ is greater than $X_{bits}$, performing a half polyhedral reduction in said Y axis toward said position;

g. reducing $Y_{bits}$ by one; and h. repeating steps e., f. and g. until step f. condition is false.

4. The method as set forth in claim 3 further comprising the steps of:

i. comparing $Z_{bits}$ to $X_{bits}$ and $Y_{bits}$;

j. when $X_{bits}$ is greater then $Z_{bits}$ and $X_{bits}$ is greater than $Y_{bits}$, performing a half polyhedral reduction in said X axis toward said position;

k. reducing $X_{bits}$ by one; and l. repeating steps i., j., and k. until step j. condition is false.

5. The method as set forth in claim 4 further comprising the steps of:

m. comparing $Z_{bits}$ to $X_{bits}$ and $Y_{bits}$;

n. when $Z_{bits}$ is equal to $Y_{bits}$ and $Z_{bits}$ is greater than $X_{bits}$, performing a quarter polyhedral reduction in said Z and Y axes toward said position;

o. reducing $Z_{bits}$ by one and reducing $Y_{bits}$ by one; and p. repeating steps m., n. and o. until step n. condition is false.

6. The method as set forth in claim 5 further comprising the steps of:

q. comparing $Z_{bits}$ to $X_{bits}$ and $Y_{bits}$;

when $Z_{bits}$ is equal to $X_{bits}$ and $Z_{bits}$ is greater than $Y_{bits}$ performing a quarter polyhedral reduction in said Z and X axes toward said position;

s. reducing $Z_{bits}$, by one and reducing $X_{bits}$ by one; and t. repeating steps q., r. and s. until step r. condition is false.

7. The method as set forth in claim 6 further comprising the steps of:

q. comparing $Z_{bits}$ to $X_{bits}$ and $Y_{bits}$;

r. when $Y_{bits}$ is equal to $X_{bits}$ and $Y_{bits}$ is greater than $Z_{bits}$, performing a quarter polyhedral reduction in said Y and X axes toward said position;

s. reducing $Y_{bits}$ by one and reducing $X_{bits}$ by one; and t. repeating steps q., r. and s. until step r. is false.

8. The method as set forth in claim 7 further comprising the steps of:

u. performing an eighth polyhedral reduction in said X, Y and Z axes;

v. reducing $Z_{bits}$ by one, $Y_{bits}$ by one and reducing $X_{bits}$ by one.

9. A computer device having a program for interpolating data, the program comprising the steps of:

storing a map of tristimulus color space data in a memory emulating a color space having a tri-variable coordinate cylindrical construct, said data stored as multi-bit data words in the memory and constituting tri-variable coordinates of a color space construct having a polyhedral construct, said memory having a predetermined set of nodes, each of said nodes being an addressable designate of three axial coordinates, C, H and L, of said cylindrical construct, where C=a radial axis vector, representing chroma values of a tristimulus color space, H=a circumferential axis vector, representing hue values of a tristimulus color space, and L=a longitudinal axis vector, representing luminance values of a tristimulus color space;

receiving a set of L,H,C variables as three multi-bit data words including bits of each word designating a point in said cylindrical construct other than a specific node, remainder bits of each word designating interpolation iterations;

retrieving adjacent stored map nodes surrounding said point, retrieved nodes constituting a sub-construct of said stored color space construct;

determining which bits in each of the three axial coordinates designate interpolation iterations, and setting a count for iteration bits of each data word to base log 2 of a difference between the adjacent stored respective map nodes values, respectively;

sequentially comparing iteration bit counts of the three axial coordinates for identity;

reducing said sub-construct iteratively in each axial vector in three, two, or one dimensions toward said point based upon the relation of counts of bits for designating interpolation iterations among the three axial coordinates, respectively, sequentially and iteratively reducing count bits and repeating said step of reducing said sub-construct until all counts equal zero;

determining interpolated output data words for the point of said cylindrical construct when said counts equal zero;

outputting coordinates determined from a last step of reducing said sub-construct.

10. The device as set forth in claim 9, further comprising the steps of:

where $C_{bits}$ is a bit count for C input data word, $H_{bits}$ is bit count for H input data word, and $L_{bits}$ is a bit count for L input data word, a. comparing $L_{bits}$ to $C_{bits}$ and $H_{bits}$;

b. when $L_{bits}$ is greater then $H_{bits}$ and $L_{bits}$ is greater than $C_{bits}$, performing a half polyhedral reduction in said L axis toward said position; c. reducing $L_{bits}$ by one; and d. repeating steps a., b. and c. until step b. condition is false.

11. The device as set forth in claim 10 further comprising the steps of:

e. comparing $L_{bits}$ to $C_{bits}$ and $H_{bits}$;

f. when $H_{bits}$ is greater then $L_{bits}$ and $H_{bits}$ is greater than $C_{bits}$, performing a half polyhedral reduction in said H axis toward said position;

g. reducing $H_{bits}$ by one; and h. repeating steps e., f. and g. until step f. condition is false.

12. The device as set forth in claim 11 further comprising the steps of:

i. comparing $L_{bits}$ to $C_{bits}$ and $H_{bits}$;

j. when $C_{bits}$ is greater then $L_{bits}$ and $C_{bits}$ is greater than $H_{bits}$, performing a half polyhedral reduction in said C axis toward said position;

k. reducing $C_{bits}$ by one; and l. repeating steps i., j. and k. until step j. condition is false.

13. The device as set forth in claim 12 further comprising the steps of:

m. comparing $L_{bits}$ to $C_{bits}$ and $H_{bits}$;

n. when $L_{bits}$ is equal to $H_{bits}$ and $L_{bits}$ is greater than $C_{bits}$, performing a quarter polyhedral reduction in said L and H axes toward said position;

o. reducing $L_{bits}$ by one and reducing $H_{bits}$ by one; and p. repeating steps m., n. and o. until step n. condition is false.

14. The device as set forth in claim 13 further comprising the steps of:

q. comparing $L_{bits}$ to $C_{bits}$ and $H_{bits}$;

r. when $L_{bits}$ is equal to $C_{bits}$ and $L_{bits}$ is greater than $H_{bits}$ performing a quarter polyhedral reduction in said L and C axes toward said position;

s. reducing $L_{bits}$ by one and reducing $C_{bits}$ by one; and t. repeating steps q., r. and s. until step r. condition is false.

15. The device as set forth in claim 14 further comprising the steps of:

q. comparing $L_{bits}$ to $C_{bits}$ and $H_{bits}$;

r. when $H_{bits}$ is equal to $C_{bits}$ and $H_{bits}$ is greater than $L_{bits}$, performing a quarter polyhedral reduction in said H and C axes toward said position;

s. reducing $H_{bits}$ by one and reducing $C_{bits}$ by one; and t. repeating steps q., r. and s. until step r. is false.

16. The device as set forth in claim 15 further comprising the steps of:

u. performing an eighth polyhedral reduction in said C, H and L axes;

v. reducing $L_{bits}$ by one, $H_{bits}$ by one and reducing $C_{bits}$ by one.

17. The device as set forth in claim 9 wherein the step of storing further comprises the steps of:

storing nodes of at least one of the variables as a non-linear sequence.

18. The method as set forth in claim 17, further comprising the steps of:

for a range of possible nodes from 0 to 255, representing color spectrum nodes in the color space storing map index nodes including:

L=0, 16, 32, 48, 64, 80, 96, 112, 128, 144, 160, 176, 192, 208, 224, 240, 255;

H=0, 8, 16, 24, 32, 40, 48, 56, 64, 72, 80, 88, 86, 104, 112, 128, 136, 144, 160, 168, 176, 184, 192, 200, 208, 216, 224, 232, 240, 248; and

C=0, 4, 8, 12, 16, 24, 32, 48, 64, 96, 128, 192, 255.

19. An ASIC having a memory programmed with a method for interpolation of tristimulus color data, said method comprising the steps of:

storing a map of tristimulus color space data in a memory emulating a color space having a tri-variable coordinate cylindrical construct, said data stored as multi-bit data words in the memory and constituting tri-variable coordinates of a color space construct having a polyhedral construct, said memory having a predetermined set of nodes, each of said nodes being an addressable designate of three axial coordinates, C, H and L, of said cylindrical construct, where C=a radial axis vector, representing chroma values of a tristimulus color space, H=a circumferential axis vector, representing hue values of a tristimulus color space, and L=a longitudinal axis vector, representing luminance values of a tristimulus color space;

receiving a set of L,H,C variables as three multi-bit data words including bits of each word designating a point in said cylindrical construct other than a specific node, remainder bits of each word designating interpolation iterations;

retrieving adjacent stored map nodes surrounding said point, retrieved nodes constituting a sub-construct of said stored color space construct;

determining which bits in each of the three axial coordinates designate interpolation iterations, and setting a count for iteration bits of each data word to base log 2 of a difference between the adjacent stored respective map nodes values, respectively;

sequentially comparing iteration bit counts of the three axial coordinates for identity;

reducing said sub-construct iteratively in each axial vector in three, two, or one dimensions toward said point based upon the relation of counts of bits for designating interpolation iterations among the three axial coordinates, respectively, sequentially and iteratively reducing count bits and repeating said step of reducing said sub-construct until all counts equal zero;

determining interpolated output data words for the point of said cylindrical construct when said counts equal zero;

outputting coordinates determined from a last step of reducing said sub-construct.

20. The ASIC as set forth in claim 19, further comprising the steps of:

storing nodes of at least one of the variables as a non-linear sequence.

* * * * *